March 25, 1958

C. G. GOETZEL ET AL 2,827,874

COMPOSITE MOLD ASSEMBLY

Filed Aug. 1, 1956

INVENTORS
CLAUS G. GOETZEL
JOHN B. ADAMEC
JOHN D. KNOX
JOHN L. ELLIS
BY Eugene J. Kalil
AGENT March 25, 1958 C. G. GOETZEL ET AL 2,827,874
COMPOSITE MOLD ASSEMBLY
Filed Aug. 1, 1956 2 Sheets-Sheet 2

INVENTORS
CLAUS G. GOETZEL
JOHN B. ADAMEC
JOHN D. KNOX
JOHN L. ELLIS
BY Eugene J Kalil
AGENT

United States Patent Office 2,827,874
Patented Mar. 25, 1958

2,827,874
COMPOSITE MOLD ASSEMBLY

Claus G. Goetzel, Hastings-on-Hudson, N. Y., John B. Adamec, Closter, N. J., and John D. Knox, Hastings-on-Hudson, and John L. Ellis, White Plains, N. Y., assignors to Sintercast Corporation of America, Yonkers, N. Y., a corporation of New York Application August 1, 1956, Serial No. 601,586

9 Claims. (Cl. 118—401)

The present invention relates to the production of infiltration articles of closely controlled dimensions and more particularly to a composite mold assembly for use at elevated temperatures in the precision production of heat and/or wear resistant articles, for example, fluid guiding members such as turbine blades and buckets, nozzles, guide vanes, and other power plant components, as well as tools, dies, bearings, bushings, seals and related products.

Heat resistant and/or hard metals, generally referred to as "Cermets," and comprised substantially of refractory metal or intermetallic compounds (for example, refractory metal carbides, borides, silicides, nitrides, aluminides, etc.) have commanded considerable attention in recent years as a source of new engineering materials for use in the production of tools, dies, bearings, seals and related wear resistant products and for use in fields involving high temperature systems such as prevail in heat engine power plants (e. g. jet engines, rocket motors, etc.) and other types of high temperature environments involving corrosion, erosion, etc. Recent advances in the design of heat engine power plants have necessitated the development of heat resistant hard and strong metals capable of withstanding high operating temperatures of up to about 950° C. and higher. However, the production of such materials regardless whether they are used at ordinary or elevated temperatures has always presented difficulties in view of the relatively high melting points of these refractory compounds which could not be melted and therefore could only be utilized in combination with matrix-forming bonding metals by means of liquid phase sintering.

One method which is employed in producing articles based on refractory compounds, such as titanium carbide, comprises commingling grains of the carbide with a matrix-forming metal or alloy powder followed by pressing into the desired shape and then sintering the shape at an elevated temperature above the melting point of the matrix metal but below that of the refractory compound (i. e. liquid phase sintering) to effect coalescence through shrinkage. Another method which is employed comprises producing a porous and coherent skeleton of a high melting substance (e. g. a metal, alloy or compound based on one of the so-called refractory metals tungsten, molybdenum, tantalum, columbium, titanium, zirconium, etc., and characterized by a melting point above 1535° C.) into which the matrix-forming metal is infiltrated or interstitially cast until substantially all the pores are filled. In either case a composite structure is formed comprising said high melting substance dispersed through the matrix metal.

The heating temperatures employed in producing the articles are high and may range up to about 250° C. above the melting point of the matrix metal. Such liquid phase heating or sintering temperatures may rang from about 1100° C. to 1700° C. Because of the high melting temperatures and the nature of materials employed, the liquid and solid phase prevailing during the sintering are generally chemically active and tend to react with the environment in which the liquid phase sintering is conducted, with the result that the product is in many instances adversely affected. This holds true for the prevailing atmospheric conditions, as well as the supports or containers contacting the article. Thus, it is important that the environment be maintained as substantially inert or protective as possible. In the case of the atmosphere, inert or protective conditions may be achieved by utilizing inert gases such as argon, helium, etc., or by utilizing a reducing gas such as carbon monoxide or hydrogen which are considered protective for the purpose. Substantially inert or protective conditions may also be effected by employing such gases at subatmospheric pressure ranging down to high vacuum.

Generally speaking, the most troublesome variable is the support, whose behavior at elevated temperatures cannot be predicted with any certainty, especially in metalliferous systems involving a reactive molten metal phase and where the heating takes place under sub-atmospheric pressure. This problem is particularly acute in the production of heat resistant articles by infiltration involving a mass movement of infiltrant metal through and/or around a porous skeleton, e. g. titanium carbide, while in contact with the support.

Considerable development work has been initiated with the aim of developing adequate supporting materials to meet particular needs in the aforementioned type of heating. For example, it has been found that substantially chemically pure alumina worked exceedingly well as an infiltration support material in the production of turbine blades or nozzle vanes from titanium carbide powder containing about 1% to 3% free carbon. Similarly, beryllia has been found to offer certain advantages in producing jet engine components from another type of titanium carbide powder containing lower free carbon in amounts ranging from about 0.1 to 1.2%. In still another development, a special type of stabilized zirconia of crystallographic structure substantially cubic in form has been found to have a broader range of utility over the two foregoing ceramic oxide substances. Zirconia has the advantage of insuring more consistently the production of infiltrated articles of good surface quality. Recent work has indicated similar advantages for thoria of high purity.

While it has been found that the foregoing ceramics when used under specified conditions have resulted in products of improved metallurgical quality, for example improved internal and external quality, practical considerations have necessitated that these products be produced as close as possible to blue print sizes in order to minimize finishing operations, in particular grinding. Articles made of refractory metal substances, such as titanium carbide, are very hard and require the use of special and expensive grinding procedures (e. g. diamond wheel grinding, etc.) to produce a finished product. Thus, it is important that size deviations in the product be avoided as much as possible. The problem is particularly acute in the production of complex shapes, for example a turbine bucket of tapered cross section having a slight twist in its foil section and having at one end a heavy root and possibly at the other end a heavy shroud section, or a nozzle vane that has a heavy cross section near the leading edge, a thin cross section at the trailing edge, and possibly a hollow running parallel with the longitudinal axis of the product.

Heretofore, in producing such complex shapes by infiltration, the ceramic employed as the support for the skeleton was usually used in bulk as a powder pack. This was done by partially filling a cylindrical flask of refractory metal such as tungsten with loose ceramic powder, e. g. zirconia powder, followed by inserting into it gently in an upright position the skeleton (e. g. a turbine blade skeleton with its root section pointing upward) and the entire assembly vibrated on a jolting table to settle and pack the ceramic powder firmly about the skeleton, meanwhile adding more ceramic to it until its surface level is just below or even with the top of the root section, the top of the root section being left exposed to receive infiltrant metal. During infiltration, the infiltrant metal flows in the skeleton body by gravity under substantially protective conditions.

As has been stated herein, while infiltrated products of improved metallurgical quality have been produced by this method, it was not always possible to produce consistently articles close to specification sizes. The use of ceramic powder in bulk surrounding the skeleton was not conducive to good temperature control (by bulk is meant thickness of ceramic of the order of about three quarters of an inch and higher, for example one and a half inches). The heat transfer in such molds was poor and, thus, it was difficult to obtain good uniform heating throughout the mold. The bulk ceramic would shrink non-uniformly whereby cracks would occur in it causing infiltrant metal to leak out and form undesirable fins and crusts on the infiltrated article. Furthermore, the non-uniform shrinkage of the powder pack would cause the skeleton to move and distort within the mold and be subjected to bending stresses. Even when the ceramic did not crack and a product of good surface appearance and properties was obtained, the product was often warped sufficiently as to make it practically useless for grinding to size.

It has now been discovered that the foregoing difficulties can be overcome by using a special mold structure comprising a rigid mold support in combination with a thin yieldable interface of an inert ceramic substance.

An important object of the invention is to provide a novel mold assembly to enable the production of substantially sound infiltrated products of controlled dimensions.

Other objects will more clearly appear from the following description when taken in conjunction with the drawing wherein.

Figure 4:
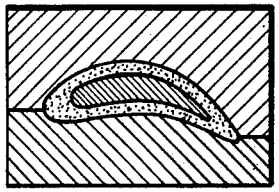
Fig. 4 shows a cross section of the mold assembly of Fig. 5 taken through line 4—4.

The results of the invention are achieved by controlling the thickness of a ceramic oxide powder between the skeleton and the mold so that in effect it is employed as an interface, the thickness of the interface being determined by the prevailing infiltration conditions and preferably by the configuration of the porous skeleton. Because of its ease of machinability and its relatively high heat of conductivity, graphite is selected as the preferred mold support. The graphite may be either dense or of porous structure and of commercial or high purity grade. Other heat and fusion resistant materials comparable to graphite in heat conductivity and formability may be employed as the mold support, for example, materials having heat conductivities of at least 0.01 cal./sq. cm./cm./°C./sec., preferably at least 0.05, such as molybdenum, titanium carbide, etc. By utilizing a relative thin, yieldable ceramic interface backed up by a rigid unyielding mold wall of requisite heat conductivity, it is possible to heat the skeleton body to the desired infiltration temperature quickly and uniformly throughout before infiltration begins, thereafter enabling the infiltration process to be carried out smoothly and efficiently to produce products of maximum density.

Depending upon the shape of the article to be produced, the mold assembly may be formed from two plates which are shaped so that when fitted together they define a cavity whose bounding walls conform substantially to the configuration of the skeleton to be infiltrated. The cavity is made slightly larger than the size of the skeleton so that when the skeleton is centered in the mold a space remains between the mold and the skeleton for receiving inert ceramic powder having a thickness which preferably varies in accordance with the configuration of the skeleton.

Near and at the top of the mold, where an end portion of a skeleton to be infiltrated terminates, the thickness of the ceramic interface near the region of the end portion, where the liquid infiltrant predominates as a reservoir during infiltration, ranges from about 0.175 to 0.6 inch. This is to prevent premature melting of the infiltrant while the skeleton is brought up to temperature, the infiltrant metal being the last to reach the temperature. Adjacent substantially all of the skeleton surface where the reservoir is not present, the ceramic interface thickness ranges from about 0.05 to 0.3 inch, the thickness adjacent said skeleton surface being always less than the thickness where the liquid infiltrant metal reservoir prevails.

Of course, the invention is also applicable to the situation where the infiltrant metal is melted separately and then brought in contact with the skeleton after the skeleton has reached the infiltration temperature.

Preferably, the ceramic interface between the skeleton and the mold wall is proportioned in thickness according to the configuration of the skeleton. Thus, while the thickness in the region where the infiltrant metal reservoir predominates will range from 0.175 to 0.6 inch, the ceramic interface adjacent the relatively smooth surfaces of the skeleton will range in thickness from about 0.05 to 0.15 inch, while at skeleton edges and sharp corners the space will range in thickness from about 0.125 to 0.25 inch. In practice, it is desired that the thickness of the ceramic interface near and at the top of the mold range from about 0.2 to 0.5 inch, while the thickness adjacent the smooth surfaces of the skeleton should range from about 0.075 to 0.1 inch and at the skeleton edges and corners from about 0.15 to 0.225 inch.

The filling of the space between the skeleton body and the closely fitting mold with powdered ceramic is achieved by gravimetric packing, e. g. by subjecting the dry powder during and after the filling of the space to vibratory and jolting forces (such as on a conventional foundry compressed air jolting table), whereby the ceramic particles are brought as closely as possible into interlocking relationship with each other, thus minimizing shrinkage of the interface at high firing temperatures. The density of the gravimetrically packed powder and consequently its shrinkage properties may be controlled by controlling the particle size distribution of the powder. This powder should be of a size substantially all less than 30 microns, preferably at least 90% all finer than 10 microns.

Figure 1:
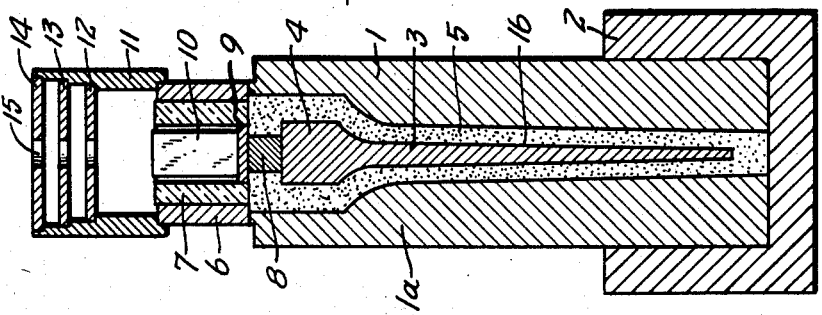
Fig. 1 is illustrative of an embodiment of the mold assembly of the invention showing in cross section the arrangement of a titanium carbide turbine bucket skeleton with respect to a ceramic interface and a mold support of graphite.

As illustrative of the novel infiltration mold assemblies provided by the invention, reference is made to Figs. 1 to 5 and 7 to 9. Fig. 1 shows a rectangular graphite mold comprising split sections 1 and 1a held in close-fitting arrangement by graphite clamp 2 which also defines the bottom of the mold. A titanium carbide turbine bucket skeleton 3 having a root section 4 is centered in the mold and separated by a space occupied by a gravimetrically packed powdered ceramic interface 5, e. g. powdered thoria, which is thicker at the top of the mold in the region of the root section where the liquid infiltrant metal reservoir predominates than along the sides of the skeleton surface in the mold proper. To complete the mold assembly a graphite ring 6 is centrally located on top of the mold with a ceramic ring 7, for example of zirconia, telescoped within it. On top of skeleton root section 4 is placed a porous gate 8 of titanium carbide on which is supported a porous disc of titanium carbide 9 upon which rests infiltration metal 10, for example, a nickel-base alloy comprising about 6% to 7% iron, 13% to 15% chromium, and the balance substantially nickel. Supported on graphite ring 6 is another graphite ring 11 internally shelved to support graphite radiation shields 12 to 14 with a peep hole 15 running through all three. During infiltration, the infiltrant metal is metered by disc 9 through gate 8 into skeleton 3 via the root portion 4.

The proportioning of the refractory interface thickness along various portions of the skeleton is determined by the conditions existing from the top to the bottom of the mold. For example, at the instance of and during infiltration near the top of the mold, just above disc 9, a substantially liquid infiltrant reservoir exists which must be protected from the graphite portions of the mold assembly by a relatively thick refractory interface ring 7 and in the region adjacent the root section for example about 0.3 inch thick. At the smooth surface of the skeleton in the mold proper, for example at 16, the interface is maintained at a smaller thickness, for example about 0.1 thick, as there is little build up of liquid phase on the surface of the skeleton. However, at relatively sharp skeleton corners where surface energy and geometry have a marked effect on causing small pools of infiltrant metal to accumulate, slightly thicker interfaces are necessary, for example of the order of about 0.2 inch. By designing the mold to meet these conditions, situations which give rise to shrinkage and warpage of the skeleton are either completely avoided or greatly minimized. Thus, smooth surfaces of the skeleton (e. g. smooth surfaces of an air foil section) are maintained as free as possible from warping stresses, making it feasible to produce an infiltrated product close to specification size.

The proportioning of the ceramic thickness in accordance with the foregoing concept has the further advantage of enabling the skeleton to be thoroughly and uniformly heated to a temperature at or above the melting point of the infiltrant metal prior to the actual melting of the metal by the increased insulating effect of the greater thickness of ceramic in the region of the infiltrant metal. The proportioning of the ceramic thickness also has the advantage of enabling the infiltrated product to be controllably cooled in one direction, which in the case of the mold of Fig. 1 is from the bottom up, thus insuring a dense structure free from shrinkage tears and cracks, porosity, pipes and certain gas-produced defects common in precision castings of similar configurations. By having a plurality of spaced fins 12, 13 and 14 covering the mold, heat loss by radiation is markedly inhibited so that the top part of the mold is last to cool.

Figure 3:
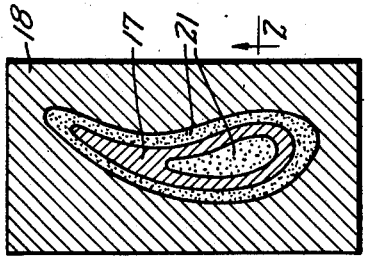
Fig. 3 is a cross section of the assembly of Fig. 2 taken through line 3—3.
Figure 2:
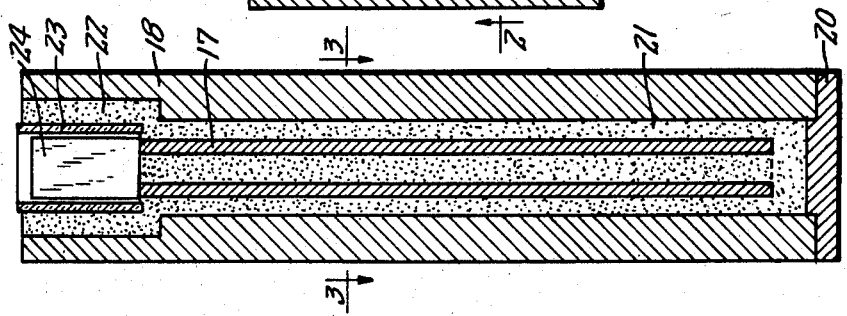
Fig. 2 is a cross section of a similar mold assembly in combination with a hollow blade skeleton of titanium carbide, said section taken through line 2—2 of Fig. 3.

Figs. 2 and 3 illustrate a mold assembly set-up employed in producing a hollow nozzle vane 17 of titanium carbide centered in a one-piece graphite flask 18 having a graphite plug 20 forming the bottom. The centrally located hollow nozzle vane skeleton 17 is surrounded by a substantially inert ceramic 21, e. g., thoria, the thickness being proportioned in accordance with the inventive concept, for example about 0.1 inch along the smooth surface of the airfoil section, about 0.2 inch at the skeleton leading and trailing edges (Fig. 3), and about 0.3 inch in the region 22 near the top of the vane and the mold as shown (Fig. 2). Above the top of the vane is supported an infiltrant metal box 23 in which is contained bulk infiltrant metal 24 of the same composition.

Figure 5:
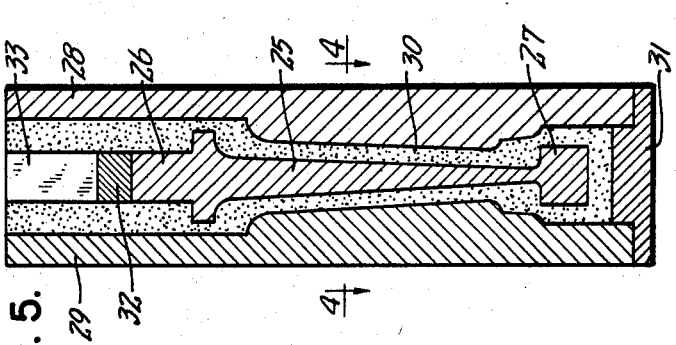
Fig. 5 depicts a vertical cross section of another embodiment of the mold assembly in combination with a titanium carbide skeleton of a turbine blade having a thick root portion and a thick shroud portion.

Figs. 4 and 5 show the type of mold assembly employed in producing a turbine bucket 25 comprising an airfoil section having a thin, tapered, twisted cross section, the blade having, as shown in Fig. 5, a relatively large rectangular root section 26 at one end and a relatively large shroud ring section 27 at the other end. As in Fig. 1, the blade skeleton is centered within a graphite mold comprising sections 28 and 29 internally configurated to enable the skeleton to be centered therein and leave a space of proportioned thickness to receive ceramic 30 of powdered thoria. The mold rests on graphite bottom 31 and the two sections held together by a graphite clamp not shown or by other suitable holding means. The root section 26 is topped by a porous titanium carbide gate 32 which in turn supports infiltrant metal 33.

The reservoir for the liquid metal may be designed in a manner that upon freezing it becomes an integral part of the infiltrated body and can be incorporated in the design of the finished product to form a readily machinable ductile fastening portion.

The thin refractory powder interface which is contoured to follow the surface configuration of the skeleton is relatively thick in the region of the root section (for example, between 0.25 and 0.3 inch), relatively thinner along the concave and convex surfaces of the foil section (for example, about 0.1 to 0.125 inch), about 0.2 inch at the leading edge and the trailing edge (Fig. 4), and also about 0.2 inch in the region surrounding the shroud section. By previously employed infiltration methods such blade configurations were almost impossible to produce free from tears or cracks at the junctions between the heavy shroud and root sections and the thin foil section.

Figure 6:
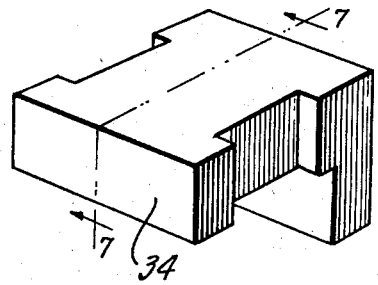
Fig. 6 illustrates a compression block produced in accordance with the invention.
Figure 7:
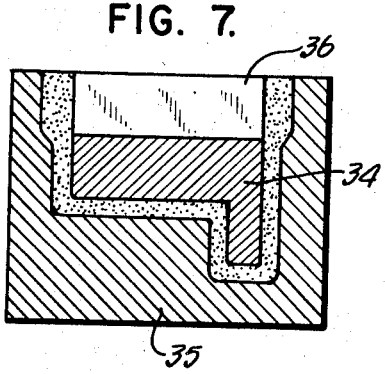
Fig. 7 depicts a cross section of the mold arrangement employed in producing the compression block of Fig. 6, said compression block being shown as a cross section along line 7—7 of said figure.

Fig. 6 is a three-dimensional view of a compression block of a high carbon, titanium alloy tool steel produced in accordance with the mold arrangement illustrated in Fig. 7 which shows a cross section taken along line 7—7 of Fig. 6 of porous titanium carbide skeleton 34 in graphite mold 35, the top of the skeleton block supporting infiltrant metal 36 of carbon steel described in Example IV hereinafter. The thickness of the ceramic interface contoured about the skeleton is substantially uniform (about, for example, one-eighth of an inch) while in the region of the infiltrant metal reservoir the ceramic interface is thicker, for example of the order of about a quarter of an inch.

Figure 8:
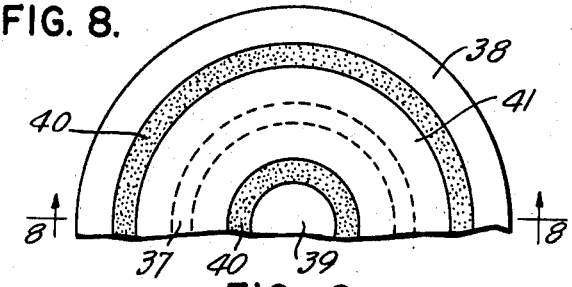
Figs. 8 and 9 are illustrative of a mold assembly used in producing a cylindrical hollow mold liner.
Figure 9:
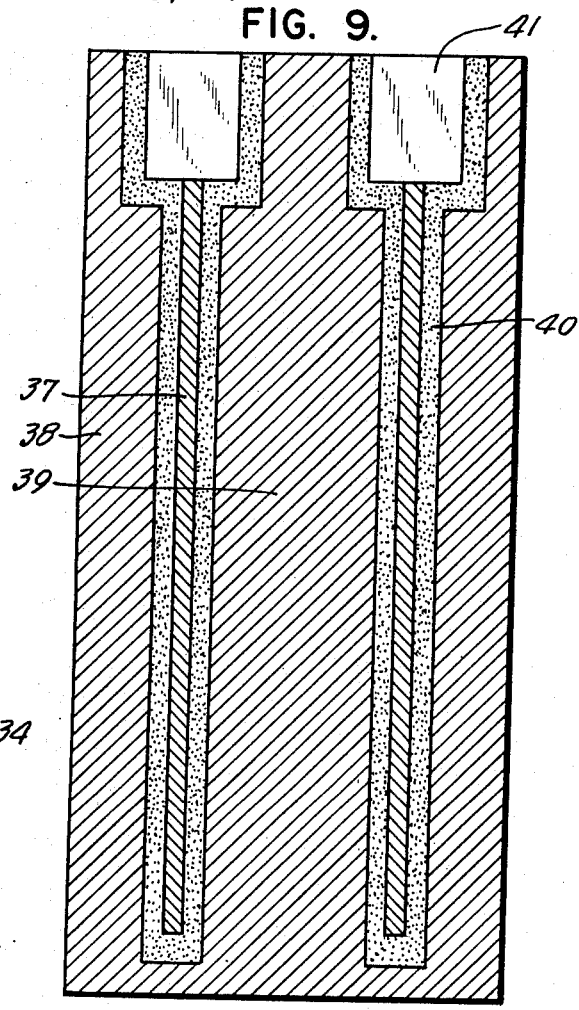

Figs. 8 and 9 illustrate an advantage of the mold assembly of the invention in the production of a thin walled bushing comprising a hard metal composition of tungsten carbide and cobalt. Details of this mold arrangement are discussed in Example V.

Results of tests conducted with close fitting graphite molds with a proportioned interface of ceramic oxide shows that marked improvements are possible over molds in which ceramic oxide is employed in bulk. In producing a series of an infiltrated titanium carbide slabs of approximately one quarter inch thick, 2 inches wide, and 4 inches long, changes across the various dimensions were maintained small and substantially uniform, and at an average of between about 1½ to a little over 2½ as shown in the following table:

| Specimen No. | Dimensions | Ave. Skeleton Dimensions¹ | Ave. Dimensions¹ After Infiltration | Percent Change |
|---|---|---|---|---|
| #1 | Width | 1.94 | 1.91 | −1.54 |
|  | Thickness | 0.252 | 0.247 | −2.0 |
|  | Length | 4.02 | 3.94 | −2.0 |
| #2 | Width | 1.95 | 1.93 | −1.03 |
|  | Thickness | 0.252 | 0.254 | +0.8 |
|  | Length | 4.00 | 3.9 | −2.5 |
| #3 | Width | 1.94 | 1.925 | −0.78 |
|  | Thickness | 0.254 | 0.253 | −0.4 |
|  | Length | 4.03 | 3.92 | −2.72 |

¹ In inches.

Considering that the skeletons before infiltration are generally about 30 to 40% porous, the foregoing data show the dimensional control which is possible after infiltration when the ceramic oxide interface is proportioned adjacent the walls of the graphite flask in accordance with the inventive concept. When the ceramic oxide is used in bulk as a skeleton support, dimensional deviations in the same product may range from 1% to as high as 10%, even though the product might be metallurgically sound. This non-uniformity is characteristic of bulk molds containing large amounts of powdered ceramic oxide of thicknesses of the order of about three-quarters of an inch and higher.

In order to achieve the results of the invention, it is important that the liquid phase heating be conducted under substantially protective conditions which may be obtained in an inert atmosphere of argon, helium, etc., or of carbon monoxide, hydrogen, or other reducing gases which do not react adversely with the materials employed in the process. It is preferred that the heating be conducted in a technical vacuum of less than 500 microns of mercury column down to about 1 micron or lower for efficient infiltration, the lowest possible attainable vacuum being preferable.

Ceramic oxides which are preferably applicable as inert interfaces in the invention are thoria, beryllia and zirconia, although alumina may also be employed under certain conditions. Certain other types of ceramic-like substances such as boron nitride alone or mixed with the foregoing ceramic oxides have also been found applicable.

The desired qualities of an interfacial substance are: (1) it should not react adversely with the skeleton body, the matrix metal, or with the mold material; (2) it should have a melting point higher than the operating temperature employed; (3) it should be chemically and physically stable and have very low vapor pressure at high temperatures; (4) it should be in powder form, should be free flowing and easily packed gravimetrically in the small gap between the skeleton and the mold walls; and (5) it should not sinter strongly together and shrink markedly during the infiltration cycle and affect adversely the dimensions and shape fidelity of the final product.

While it is known that ceramic oxide interfaces have been employed as a mold wash in the prior art, the interface produced by gravimetric packing employed in this invention is not the same. A ceramic mold wash starts off with a solution binder and once it evaporates, especially during heating, the ceramic layer tends to flake off, chip and abrade away easily thus allowing the liquid metal phase to get underneath the coating and react adversely with the mold. A dried ceramic mold wash cannot take sudden heat shock the way a gravimetrically packed ceramic interface does. Unlike a mold wash layer a dry powder packing is capable of tolerating slight interparticle movement without adverse affects on the cohesiveness of the interface. It would be difficult to produce a mold wash interface of proportioned thickness on two halves of a graphite mold and expect them to match evenly when fitted snugly about a skeleton. Assembling a thus-coated mold about a skeleton is certain to disrupt the mold wash layer. Minor variations in the dimensions of a skeleton are compensated for by the packing technique of the invention, whereas a mold coated with a wash would have to be remachined for each variation. In other words, the interface provided by the invention retains all the advantages of a packed powder and yet acts as an integral part of mold surface.

As illustrative of the invention, the following examples are given:

Example 1

In producing a turbine bucket with a twisted and tapered airfoil section in accordance with the invention, a batch of titanium carbide powder of substantially less than 10 microns in particle size and containing approximately 79.1% titanium, about 19.2% combined carbon and about .14% free carbon (the balance free titanium, iron, oxygen, nitrogen, zirconium, etc.) was blended dry with about 1% by weight of a thermosetting phenolformaldehyde type resin. The mixture was then moistened with acetone, wet mixed thoroughly, and the powder mass finally dried, pulverized and passed through a 100 mesh screen (U. S. Standard). Approximately 700 grams of the powder were pressed into a rectangular block (1½ inches, by 2 inches, by 5 inches) to a density of about 52% of full density (i. e. 48% porosity by volume). The block was then sintered for one hour at 1300° C. in a vacuum ranging from 32 to 25 microns of mercury column. The sintered block with a density of about 60% of full density was cooled under vacuum, removed and then accurately machined to the contours of the bucket shape comprising a root-section and a foil section. The total weight of the skeleton body was approximately 150 grams after machining.

The skeleton body was then placed into a two part close-fitting, degassed graphite flask (note Fig. 1) having a cavity conforming substantially in shape to the blade, the cavity being slightly larger than that of the blade dimensions, the space between the skeleton and the mold being then packed with pulverulent thoria which had been previously treated to drive off any moisture, the powder having the following approximate size distribution:

| | Percent |
|---|---|
| Less than 30 microns | about 100 |
| Less than 20 microns | about 99 |
| Less than 15 microns | about 98 |
| Less than 10 microns | about 95 |
| Less than 2 microns | about 85 |
| Less than 1.5 microns | about 36 |

In other words, substantially all of the powder was less than 10 microns. The thickness of the ceramic interface near the infiltrating end or root section was about 0.3 inch, at the smooth surface of the foil section about 0.1 inch, and at the edges and corners of the skeleton about 0.2 inch. The entire assembly was vibrated on a conventional factory jolting table. Additional thoria was added until it completely surrounded the bucket skeleton shape, leaving the end surface of the root section exposed. A porous titanium carbide disc and a titanium carbide gate both of which had been pressed from a minus 325 mesh titanium carbide powder and sintered in vacuum at 1400° C. were placed on the exposed end surface of the bucket, as shown in Fig. 1, the gate being placed between the disc and the skeleton. A pressed ring of ceramic fitting this disc was now placed over it and the infiltrant allotment placed into the container. The infiltrant metal in this case consisted of approximately 250 grams of a heat resistant alloy of the type comprising about 14% chromium, about 7% iron, 2.5% titanium, 0.7% aluminum, and the balance substantially nickel. The entire assembly was then lowered into a carbon tube induction heated vacuum furnace, the furnace being evacuated very slowly to avoid any disruption of the thoria interface by the eruption of entrapped air. The skeleton was thoroughly and uniformly heated to a temperature at or above the melting point of the infiltrant metal prior to the melting and subsequent infiltration of the molten infiltrant metal into the skeleton. The interstitial penetration or infiltration of the alloy into the pores of the skeleton was conducted at 1400° C. for one hour at a vacuum of 30 microns of mercury column at the infiltration temperature. The infiltrant metal penetrates the pores of the skeleton vertically, filling the body completely through its entire length. Directional solidification was achieved in the infiltrated body by cooling from the bottom upward, the power input being progressively decreased in the lower portions of the furnace while maintaining a high power input at the upper portions. The use of the differential power input during the cooling caused the infiltrated body to freeze progressively from the extreme end opposite the molten metal reservoir, the conditions being such that the molten metal reservoir was the last portion of the composite body to solidify. After cooling in a vacuum to the solidification of the lowest melting phase, the cooling was continued in a reducing or neutral atmosphere at substantially atmospheric pressure. The cooled assembly was then removed from the furnace. The removal of the infiltrated bucket shape from the thoria mass could be readily effected since substantially no reaction occurred between any of the metalliferous phases and the inert support mass. The infiltrated body was substantially free from surface imperfections and adherences and the excess metal which had not infiltrated the skeleton body remained above it in the pressed zirconia ring. The bucket produced in this manner had an average density of about 6.2 grams per cubic centimeter. The concave and convex faces of the air foil section required only polishing before use, whereas the root section required machining of serrations into the excess metal at the root, needed for attaching to the turbine wheel. The dimensions of the bucket were uniformly controlled within the tolerance of the design specification.

*Example II*

In producing a prismatic fluid guide vane with an airfoil shaped hollow running parallel to the longitudinal axis in accordance with the invention, a batch of titanium carbide powder of substantially less than 10 microns in particle size and containing approximately 0.14% free carbon was mixed with approximately 3% paraffin in solution with carbon tetrachloride. After drying, the powder was passed through a 30 mesh screen. Approximately 300 grams of the powder was loaded into a rectangular rubber bag ¾ in. by 2¼ in. by 6 in. in which was positioned a steel core rod of the dimensions and contours of the hollow desired in the nozzle vane. The bag was sealed and the whole assembly subjected to a hydrostatic pressure of approximately ¾ of a ton per square inch. This action compacted the powder to the form, which upon removal from the bag and the withdrawal of the steel core rod, was a reasonably strong ¾" by 2" by 5" briquet with an airfoil-shaped hollow 1" wide and a maximum height of 5/16", running the length of the briquet along the longitudinal axis. The briquet was sintered at 1350° C. for ¾ hour in a vacuum ranging from 10 to 50 microns of mercury column and had the final density of approximately 58% of full. The sintered briquet was accurately machined to the required contours of the nozzle vane, the concave and convex faces being accurately located in relation to the airfoil-shaped hollow. The porous hollow titanium carbide nozzle vane (weighing approximately 100 grams) of essentially the same dimensions of the required finished product was 2 3/16 in. wide, ½ in. high at its maximum cross-sectional height, 5 in. long, and has a minimum wall thickness of .1 in. between the outside surface and the hollow core at the leading edge and the concave and convex faces.

The skeleton body was then positioned into a close-fitting degassed graphite flask of the type shown in Fig. 3 having a cavity conforming substantially in shape to the outside contours of the vane, the cavity being slightly larger than that of the vane dimensions. The space between the mold and the skeleton and the hollow of the skeleton was gravimetrically packed with thoria powder, which had been treated to drive off any moisture, and having the same approximate size distribution as given in Example I.

The thickness of the refractory interface across the bottom edge of the vane was about 0.25 in., at the concave and convex faces about 0.1 in., at the leading and trailing edges of the skeleton about 0.2 in. (Fig. 3). The entire assembly was vibrated on a conventional factory jolting table. The top end of the skeleton protruded from the thoria approximately ⅛ in. The infiltrant charge of approximately 130 grams consisted of sheet bent to form a rectangular box and slugs fitting inside of a heat resistant alloy of the type comprising about 14% chromium, about 7% iron, and the balance substantially nickel. The alloy box and slugs were placed over the exposed surface of the skeleton, and additional thoria packed around the infiltrant. The top of the mold was so shaped that at least 0.2 in. of ceramic was between infiltrant and graphite surface. The entire assembly was then lowered into a carbon tube induction heated vacuum furnace. The furnace was evacuated very slowly to avoid any disruption of the thoria interface by eruption of entrapped air. The furnace was brought up to the infiltration temperature of 1450° C. at a controlled rate to assure complete and uniform heating of the mold assembly. The infiltration of the alloy into the pores of the skeleton was conducted at 1450° C. for ½ hour at a vacuum of 1 to 10 microns of mercury column. The infiltrated body was cooled from the bottom up by progressively decreasing the power input to the lower portions of the furnace while the temperature was slowly reduced to the solidification temperature of the lowest melting phase. The cooling was continued under vacuum until the assembly reached a temperature of 50 to 200° C. The infiltrated vane could be easily removed from the thoria since substantially no reaction occurred between any of the metalliferous phase and the inert support mass, and the thoria had remained in a granulated unsintered state.

The vane produced in this manner has an average density of about 6.4 grams per cubic centimeter and was dimensionally accurate within the required tolerances. The excess metal was removed from the top end by slicing, and the concave and convex surfaces needed only polishing before use.

*Example III*

In producing a turbine bucket with a thin, twisted and tapered airfoil section, with a large rectangular root at one end and a large rectangular shroud ring section at the other, a skeleton of the desired shape and dimensions was produced from a sintered block with the method outlined in Example I.

The machined titanium carbide skeleton weighing 66 grams and having a density of approximately 60% of full was positioned in a two-part, close-fitting degassed graphite flask of the type shown in Fig. 5 having a cavity conforming substantially to the bucket in shape, the cavity being slightly larger than that of the bucket dimensions. The space between the skeleton and mold was then packed by the aid of a jolting table with thoria powder of essentially the same physical characteristics as that used in Example I. The thickness of the ceramic interface at the faces of the root section was approximately 0.25 in., at the faces of the shroud section about 0.2 in., and at the airfoil section about 0.2 in. at the leading and trailing edges (Fig. 4) and about 0.1 in. at the concave and convex faces with the exception that for a length of 0.3 in. along the airfoil, from the transition from airfoil to the rectangular sections the thickness of the interface was .05 in. greater than the distance the rectangular sections projected from the airfoil faces. This configuration of the ceramic interface held the body rigid in the transverse direction at both the airfoil and end sections, but allowed for shrinkage of the body in the longitudinal direction by the cushioning and compressibility effects of the extra thickness of the thoria powder at the regions of marked changes in cross section.

A porous titanium carbide block or gate of 60% density with the same cross sectional dimensions as the root section of the bucket, and about ¼ in. high was placed on top of the exposed root surface. A 92 gram slug of a heat resistant metal alloy comprising 10% nickel, about 25% chromium, and about 7.5% tungsten, and about 0.5% carbon, and the balance substantially cobalt was placed on top and thoria was packed around the four sides of the pieces. The thickness of the interface between infiltrant and the graphite flask was about 0.2 in.

The same conditions were employed in the infiltration of the porous bucket skeleton as given in Example I, excepting that the time at infiltration temperature was 20 minutes.

The infiltrated bucket produced in this manner has an average density of about 6.2 grams per cubic centimeter and was dimensionally within the required tolerances. The concave and convex faces of the airfoil section required only polishing before use, whereas the root and shroud sections required the machining of serrations, dovetails and keyways for attaching to the turbine wheel assembly.

*Example IV*

In producing a compression block with an I-shaped section at right angles with a rectangular section, approximately 70 grams of minus 325 mesh titanium carbide powder containing 79.1% titanium, about 19.2% combined carbon and about 2.5% free carbon was compacted in a rectangular steel die. The resulting block was sintered at 1340° C. for one half hour in a vacuum in the range of 10 to 50 microns of mercury column. The sintered block, 1 in. by 1 in. by 1½ in., with a density of about 63% of full density was cooled under vacuum, removed and then accurately machined to the shape of the required compression block (note Fig. 1), the I-section being about 1½ in. long, ⅝ in. wide at the web, 1 in. wide at the flanges, and ½ in. thick, with a rectangular section ½ in. long by ¼ in. thick and 1 in. wide extending at right angles of one of the flanges. The shaped skeleton with I-shaped horizontal and rectangular section vertically downward was positioned into a close fitting graphite mold (Fig. 7) the cavity of which was slightly larger than the dimensions of the block. Thoria powder of essentially the same physical characteristics as that used in Example I was packed in the space between the skeleton and the mold.

Approximatley 0.1 in. of ceramic interface separated the skeleton from the mold on faces. The infiltrant metal, in this case a steel with approximately 0.8% carbon, about 0.75% manganese, and the balance substantially iron, in the form of a 50 gram slab was placed on the exposed surface of the skeleton. The thickness of the thoria interface adjacent the infiltrant metal was about ¼ inch. The whole assembly was placed in an induction heated vacuum furnace. The infiltration of the alloy into the pores of the skeleton was conducted at 1500° C. for ½ hour at a vacuum of 10 to 80 microns of mercury column at the infiltration temperature.

The infiltrated body was cooled directionally towards the infiltrating end under vacuum, stripped from the mold, and polished on all surfaces with the excess metal infiltrant being machined away from one face. The finished block weighed 85 grams and had a density of 6.7 grams per cubic centimeter.

*Example V*

In accordance with this invention, a thin walled bushing for use as a powder metallurgy compacting die liner was produced of tungsten carbide-cobalt hard metal.

Approximately 950 grams of tungsten carbide powder of the size range of 1 to 5 microns was mixed with approximately 2% by weight of paraffin wax in a carbon tetrachloride solution, dried, and passed through a 50 mesh screen. The powder was hydrostatically compacted around a steel core into a hollow cylinder approximately 6 in. high, 2 in. outside diameter, and 1⅝ in. inside diameter. The compact was sintered at 1425° C. for one hour in a vacuum ranging from 10 to 50 microns of mercury column and had the final density of approximately 57% of full.

The sintered carbide cylinder 37 (note Figs. 8 and 9) was located in a degassed graphite cylindrical mold 38 having an inside diameter approximately 0.2 in. greater than the outside diameter of the tungsten carbide skeleton, and a graphite core rod 39 with a diameter approximately 0.2 in. smaller than the inside diameter of the skeleton. The spaces at the bottom and side thus formed were filled with thoria powder 40 of essentially the same physical characteristics as that used in Example I. The top surface of the cylinder was exposed. The interfacial thickness of the gravimetrically packed powder along the cylindrical surface of the thin walled skeleton was maintained at above one eighth of an inch, the thickness in the region of the infiltrant metal being slightly less than one-quarter inch.

Approximately 560 grams of WC-Co eutectic (35% WC, 65% Co) metal in the form of a cast ring 41 of about 2½ in. outside diameter and 1 in. inside diameter were placed in contact with the exposed surface of the tungsten carbide skeleton.

The entire assembly was lowered into a carbon tube induction heated vacuum furnace. The infiltration of the alloy into the pores of the skeleton was conducted at 1480° C. for one-half hour at a vacuum ranging from 10 to 100 microns at the melting temperature, and thereafter directionally cooled.

The bushing thus produced was sound in all sections, had an average density of 14.0 grams per cubic centimeter, was straight, true, round and concentric, and had a surface which only required a minimum of finishing on the inside wall before use.

*Example VI*

In accordance with the invention, a rectangular test bar was produced of nickel alloy infiltrated molybdenum skeleton.

Approximately 45 grams of minus 325 mesh molybdenum powder was compacted in a steel die into a porous bar approximately 4″ long by ½ inch wide by ¼ inch high. The compact was sintered at 1500° C. for one half hour in a vacuum ranging from 10 to 50 microns of mercury column and had a final density of approximately 61% of full.

The sintered porous bar was located with its long axis vertical, in a close fitting graphite mold, the cavity of which was a little greater than the dimensions of the bar. Thoria powder of essentially the same physical characteristics as that used in Example I was packed in the space between the skeleton and the mold, the top of the skeleton being left exposed.

Approximately 0.1 inch of thoria interface separated the skeleton from the mold on the faces, the distance being slightly larger at the corners. The infiltrant metal, in this case a nickel alloy containing approximately 5% aluminum-95% nickel in the form of a 34 gram slug, was placed on the exposed surface of the skeleton. The thickness of the thoria interface adjacent to the infiltrant metal was about ¼ inch. The whole assembly was placed in an induction heated vacuum furnace. The infiltration of the alloy into the pores of the skeleton was conducted at 1500° C. for ten minutes at a vacuum of 10 to 80 microns of mercury column at the infiltration temperature.

The infiltrated body was cooled directionally towards the infiltrating end under vacuum, removed from the thoria pack, and polished on all surfaces with the excess infiltrant metal being machined away from one end. The finished bar weighed 66 grams and has a density of 9.5 grams per cubic centimeter.

*Example VII*

A rectangular test bar was produced in accordance with the invention comprising a nickel alloy infiltrated tungsten-chromium alloy skeleton.

Eighty parts by weight of a minus 325 mesh tungsten powder and twenty parts by weight of a minus 325 mesh chromium powder were thoroughly blended and charged into an alumina crucible and heated in a reducing atmosphere to a temperature of 1700° C. for a period of about one hour. The resulting sintered and alloyed cake was crushed, pulverized, and passed through a 325 mesh sieve.

Approximately 65 grams of the alloy powder were mixed with approximately 3% paraffin wax in a carbon tetrachloride solution, dried and passed through a 50 mesh screen. The powder was compacted in a steel die into a porous bar approximately 4 inches long by ½ inch wide by ¼ inch high. The compact was sintered at 1500° C. for one-half hour in a vacuum ranging from 10 to 50 microns of mercury column and had a final density of approximately 46% of full.

The sintered porous bar was located with its long axis vertical in a close fitting graphite mold, the cavity of which was a little greater than the dimensions of the bar. Thoria powder of essentially the same physical characteristics as that used in Example I was packed in the space between the skeleton and the mold, the top of the skeleton being left exposed.

Approximately 0.1 inch of thoria interface separated the skeleton from the mold on the faces, the distance being a little greater at the corners. The infiltrant metal, in this case a nickel alloy containing approximately 16% chromium, 17% molybdenum, 4% tungsten, 5% iron, balance substantially nickel, in the form of a 61 gram slug, was placed on the exposed surface of the skeleton. The thickness of the thoria interface adjacent to the infiltrant metal was about ¼ inch. The whole assembly was placed in an induction heated vacuum furnace. The infiltration of the alloy into the pores of the skeleton was conducted at 1470° C. for five minutes at a vacuum of 10 to 80 microns of mercury column at the infiltration temperature.

The infiltrated body was cooled directionally toward the infiltrating end under vacuum, removed from the thoria pack, and polished on all surfaces with the excess infiltrant metal being machined away from one end. The finished bar weighed 106 grams and had a density of 11.69 grams per cubic centimeter.

*Example VIII*

In accordance with the invention, a rectangular test bar was produced of cobalt alloy infiltrated molybdenum disilicide skeleton.

About 63.2 parts by weight of a minus 325 mesh molybdenum powder and 36.8 parts by weight of a minus 325 mesh silicon powder were thoroughly blended. The mixed powder was compacted into slugs and charged into zirconia crucible and heated in a reducing atmosphere to a temperature of 1040° C., at which temperature a reaction took place. The resulting reacted slugs were crushed, pulverized, and passed through a 325 mesh sieve.

Approximately 25 grams of the alloy powder were mixed with approximately 3% paraffin wax in a carbon tetrachloride solution, dried and passed through a 50 mesh screen. The powder was compacted in a steel die into a porous bar approximately 4 inches long by ½ inch wide by ¼ inch high. The compact was sintered at 1300° C. for ½ hour in a vacuum ranging from 10 to 50 microns of mercury column and had a final density of approximately 66% of full.

The sintered porous bar was located with its long axis vertical in a close fitting graphite mold, the cavity of which was a little greater than the dimensions of the block. Thoria powder of essentially the same physical characteristics as that used in Example I was packed in the space between the skeleton and the mold, the top of the skeleton being left exposed.

Approximately 0.1 inch of thoria interface separated the porous skeleton from the mold on the faces. The infiltrant metal, in this case a cobalt alloy containing approximately 27% Cr, 5% Mo, 3% Ni, 1% Fe, balance substantially Co, in the form of a 25 gram slug, was placed on the exposed surface of the skeleton. The thickness of the thoria interface adjacent to the infiltrant metal was about ¼ inch. The whole assembly was placed in an induction heated vacuum furnace. The infiltration of the alloy into the pores of the skeleton was conducted at 1520° C. for 30 minutes at a vacuum of 10 to 80 microns of mercury column at the infiltration temperature.

The infiltrated body was cooled directionally towards the infiltrating end under vacuum, removed from the thoria pack, and polished on all surfaces with the excess infiltrant metal being machined away from one end. The finished bar weighed 41 grams and had a density of 6.97 grams per cubic centimeter.

*Example IX*

Also in accordance with the invention, a test bar was produced of a nickel-aluminum alloy infiltrated tungsten skeleton.

The procedure of Example VI was used except that minus 325 mesh tungsten powder was used to produce a porous skeleton of approximately 46% of full density, the infiltrant metal alloy having a composition of about 68 parts nickel and 32 parts aluminum. The infiltration was conducted at 1800° C. for 30 minutes. The finished bar had a density of 12.1 grams per cubic centimeter.

*Example X*

A test bar was produced of a chromium-containing steel alloy infiltrated chromium boride skeleton.

The procedure of Example VI was employed except that minus 325 mesh chromium boride powder was used to produce a porous skeleton of approximately 58% of full density, and the infiltrant metal alloy had a composition of approximately 18% chromium, 0.12 carbon and balance iron. The infiltration was conducted at 1500° C. for one hour. The finished bar had a density of 6.8 grams per cubic centimeter.

One advantage of the invention is that the use of a graphite mold in conjunction with a relatively thin ceramic interface enables the conditions within the mold to be controlled to a degree that insures the production of metallurgically sound and dimensionally highly accurate products. Due to the good heat transfer properties of the graphite and the minimum of thermal lag introduced by a thin ceramic interface, such factors as the uniform heating of the mold and skeleton body and the possibility of directional solidification by controlled cooling of the infiltrated products are readily achieved.

The invention is particularly applicable to those systems where extensive solubility between infiltrant and skeleton, or low skeleton density, necessitates the presence of a large amount of liquid phase which tends to slump the body.

In the infiltration of an irregular shape with a recessed portion perpendicular to the longitudinal axis, such as a dumbbell shaped tensile or stress rupture test specimen, or a turbine bucket with both a root and shroud ring section, the invention provides a method whereby hot tearing due to stresses imposed by the support upon contraction of such dumbbell shaped products during infiltration is overcome. The use of thoria powder in a fluid-like pulverulent or granulated unsintered state as an interface offers the unique property of allowing the object freedom of movement in the longitudinal axis (provided proper thickness of the interface at the transition between the cross sections is maintained), but movement in the transverse direction is restricted by the bolstering effect of the close proximity of the graphite mold wall.

For consistent results, tests have shown that the particle size distribution of the refractory interface should preferably be controlled over the following range:

|  | Percent |
|---|---|
| Less than 30 microns | 100 |
| Less than 20 microns | about 95 to 100 |
| Less than 15 microns | about 93 to 99 |
| Less than 10 microns | about 90 to 98 |
| Less than 5 microns | about 75 to 95 |
| Less than 1.5 microns | about 20 to 50 |

While the illustrative examples given hereinbefore are mostly concerned with liquid phase sintering (infiltration) in metalliferous systems comprising titanium carbide and a liquid matrix-forming metal, it will be appreciated that other refractory substances may be employed. Such refractory substances are characterized by melting points above 1535° C. and include such refractory metals as tungsten, molybdenum, columbium, tantalum, titanium, zirconium, and mixtures of at least two of these metals with each other and alloys thereof with chromium and vanadium. The expression "refractory metal substances" as employed herein is also meant to cover compounds of the foregoing refractory metals, as well as chromium and vanadium, such compounds including the carbides, borides, nitrides, silicides, aluminides, and mixtures thereof.

The invention is particularly applicable to refractory metal carbides, particularly titanium carbide or a carbide based on titanium. Thus, titanium base carbide may comprise up to about 5% by volume of each of such metal carbides as silicon carbide, boron carbide, and up to about 10% by volume each of chromium carbide, columbium carbide, tantalum carbide, vanadium carbide, molybdenum carbide, tungsten carbide, zirconium carbide or hafnium carbide, the total amounts of these carbides generally not exceeding 25% by volume of the titanium-base carbide. By titanium-base carbide is meant a carbide comprising substantially titanium.

The matrix-forming metals which may be employed in the metalliferous systems referred to herein include the iron group metals iron, nickel and cobalt, mixtures thereof, and alloys based on these metals, for example, heat-resistant nickel-base, cobalt-base and iron-base alloys as well as a wide range of steels including alloy steels and tool steels. All such matrix-forming metals have melting points above 1100° C.

Examples of nickel-base matrix-forming alloys include: 80% nickel and 20% chromium; 80% nickel, 14% chromium and 6% iron; 15% chromium, 7% iron, 1% columbium, 2.5% titanium, 0.7% aluminum, and the balance nickel; 28% cobalt, 15% chromium, 3% molybdenum, 3% aluminum, 2% titanium, and the balance substantially nickel; 13.5% cobalt, 20% chromium, 4% molybdenum, 3% aluminum, 3% titanium, and the balance substantially nickel; 58% nickel, 15% chromium, 17% molybdenum, 5% tungsten and 5% iron; 95% nickel, 4.5% aluminum, and 0.5% manganese, etc.

Examples of cobalt-base alloys which may be employed as matrix-forming metals include: 69% cobalt, 25% chromium and 6% molybdenum; 65% cobalt, 25% chromium, 6% tungsten, 2% nickel, 1% iron and other elements making up the balance of 1%; 56% cobalt, 10% nickel, 26% chromium and 7.5% tungsten; and 51.5% cobalt, 10% nickel, 20% chromium, 15% tungsten, 2% iron, and 1.5% manganese; 44% cobalt, 17% tungsten, 33% chromium, 2.25% carbon, and the balance other metals such as iron, manganese, etc.

Some of the iron-base matrix-forming alloys include: 53% iron, 25% nickel, 16% chromium, and 6% molybdenum; 74% iron, 18% chromium and 8% nickel; 86% iron and 14% chromium; 82% iron and 18% chromium; 73% iron and 27% chromium, etc. Examples of steels which may be employed as matrix-forming metals include: SAE 1010 steel, SAE 1020 steel, SAE 1030 steel, SAE 1040 steel, SAE 1080 steel, etc. Low, medium and high alloy steels may also be employed, including the following: about 0.8% chromium, 0.2% molybdenum, about 0.30% carbon, and iron substantially the balance; about 5% chromium, 1.4% molybdenum, 1.4% tungsten, 0.45% vanadium, 0.35% carbon, and iron substantially the balance; about 8% molybdenum, 4% chromium, 2% vanadium, 0.85% carbon, and iron substantially the balance; about 18% tungsten, 4% chromium, 1% vanadium, 0.75% carbon, and iron substantially the balance; about 20% tungsten, 12% cobalt, 4% chromium, 2% vanadium, 0.80% carbon, and iron substantially the balance.

The matrix-forming metals or alloys broadly suitable in forming heat-resistant articles may contain up to about 30% by weight of a metal selected from the group consisting of chromium, molybdenum and tungsten, the sum of the metals of said group preferably not exceeding 40%, substantially the balance being at least one iron group metal selected from the group consisting of iron, cobalt and nickel, the sum of the iron group metals being preferably at least about 40% by weight of the matrix-forming alloy. If desired, the matrix-forming alloy may also contain up to about 8% total of at least one metal from the group columbium, tantalum and vanadium.

Heat resistant alloys of the aforementioned types containing effective amounts of so-called well-known strengthening or age-hardening elements, such as zirconium, titanium, aluminum, etc., may also be employed.

Metalliferous systems based on refractory metal compounds (e. g. titanium-base carbide) and matrix-forming metals, may be produced over a wide range of compositions. In producing bodies by liquid phase sintering or by infiltration, the refractory metal compound may range from about 40% to 80% by volume (preferably about 45% to 75%) and the matrix-forming metal range from about 60% to 20% by volume (preferably about 55% to 25%).

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A mold assembly comprising an infiltratable porous skeleton of high melting refractory metal material supported within a mold of a fusion-resistant material having a heat conductivity of at least about 0.01 cal./sq. cm./cm./° C./sec., substantially all of said skeleton being separated from the walls of said mold by an interfacial layer of gravimetrically packed inert ceramic powder, an end of said skeleton being left exposed to receive infiltrant metal, means associated with said skeleton end for directing the flow of infiltrant metal into said skeleton, the thickness of the ceramic being so proportioned about the skeleton that in the region of the infiltrant metal end where liquid phase infiltrant metal predominates during infiltration the ceramic thickness ranges from about 0.175 to 0.6 inch while adjacent substantially all of the skeleton surface away from said infiltrating end the thickness of gravimetrically packed ceramic powder ranges from about 0.05 to 0.3 inch, the thickness adjacent said skeleton surface being less than that where the liquid phase infiltrant metal predominates.

2. A mold assembly comprising an infiltratable porous skeleton body supported within a mold, said mold comprising a graphite flask having an opened top and having a cavity whose bounding walls conform substantially to the external configuration of said skeleton, said skeleton being separated from the walls by an interface of a substantially inert ceramic powder pack, an end of said skeleton being left exposed to receive infiltrant metal, means associated with said skeleton end for directing the flow of infiltrant metal into said skeleton, the packing between the skeleton and the graphite body having a thickness which near the top of the skeleton ranges from about 0.175 to 0.6 inch, which adjacent the smooth surfaces of the skeleton ranges from about 0.05 to 0.15 inch and which near the edges and the corners of the skeleton below the top of the mold ranges from about 0.125 to 0.25 inch.

3. A mold assembly comprising an infiltratable porous skeleton body supported in a mold, said mold comprising a graphite flask having an opened top and having a cavity whose bounding walls conform substantially to the external configuration of said skeleton, said skeleton being separated from the walls by an interface of a substantially inert ceramic oxide powder pack, an end of said skeleton being left exposed to receive infiltrant metal, means associated with said skeleton end for directing the flow of infiltrant metal into said skeleton, the packing between the skeleton and the graphite body having a thickness which near the top of the skeleton ranges from about 0.25 to 0.5 inch, which adjacent the smooth surface of the skeleton ranges from about 0.075 to 0.1 inch and which near the edges and the corners of the skeleton below the top of the mold ranges from about 0.15 to 0.225 inch.

4. The mold assembly of claim 3 wherein the porous skeleton is comprised of a high melting point refractory metal substance and wherein the ceramic oxide interface is selected from the group consisting of thoria, zirconia, beryllia and alumina.

5. The mold combination of claim 4 wherein the refractory metal substance comprises titanium carbide.

6. A mold assembly comprising an infiltratable porous skeleton body supported in a mold, said mold comprising a graphite flask having an opened top and having a cavity whose bounding walls conform substantially to the external configuration of said skeleton, said skeleton being separated from the walls by an interface of a substantially inert ceramic oxide powder pack, the packing between the skeleton and the graphite body having a thickness which near the top of the skeleton ranges from 0.175 to 0.6 inch, which adjacent the smooth surface of the skeleton ranges from about 0.05 to 0.15 inch and which near the edges and the corners of the skeleton below the top of the mold ranges from about 0.125 to 0.25 inch, a porous metering plate of same material as said skeleton lying on top of said skeleton, a ceramic oxide ring of wall thickness ranging from 0.175 to 0.6 inch surrounding said plate and a closely fitting graphite ring surrounding said ceramic oxide ring.

7. In combination a mold and an infiltratable porous skeleton body supported therein, said mold comprising a graphite flask having an opened top and having a cavity whose bounding walls conform substantially to the external configuration of said skeleton, said skeleton being separated from the walls by an interface of a substantially inert ceramic oxide powder pack, the packing between the skeleton and the graphite body having a thickness which near the top of the skeleton ranges from 0.25 to 0.5 inch, which adjacent the smooth surface of the skeleton ranges from about 0.075 to 0.1 inch and which near the edges and the corners of the skeleton below the top of said mold ranges from about 0.15 to 0.225 inch, a porous metering plate of same material as said skeleton lying on the top of said skeleton, a ceramic oxide ring of wall thickness ranging from about 0.175 to 0.6 inch surrounding said plate and a closely fitting graphite ring surrounding said refractory oxide ring.

8. The mold combination of claim 7 wherein the porous skeleton is comprised of a high melting point refractory metal substance and wherein the ceramic oxide interface is selected from the group consisting of thoria, zirconia, beryllia and alumina.

9. The mold combination of claim 8 wherein the refractory metal substance forming the skeleton comprises titanium carbide.

References Cited in the file of this patent
UNITED STATES PATENTS

| | | |
|---|---|---|
| 2,381,616 | Pfleger | Aug. 7, 1945 |
| 2,714,556 | Goetzel | Aug. 2, 1955 |
| 2,751,293 | Haller | June 19, 1956 |